June 24, 1947.  C. S. OST  2,422,745
PROPORTIONAL RULER
Filed Feb. 14, 1945  2 Sheets-Sheet 1
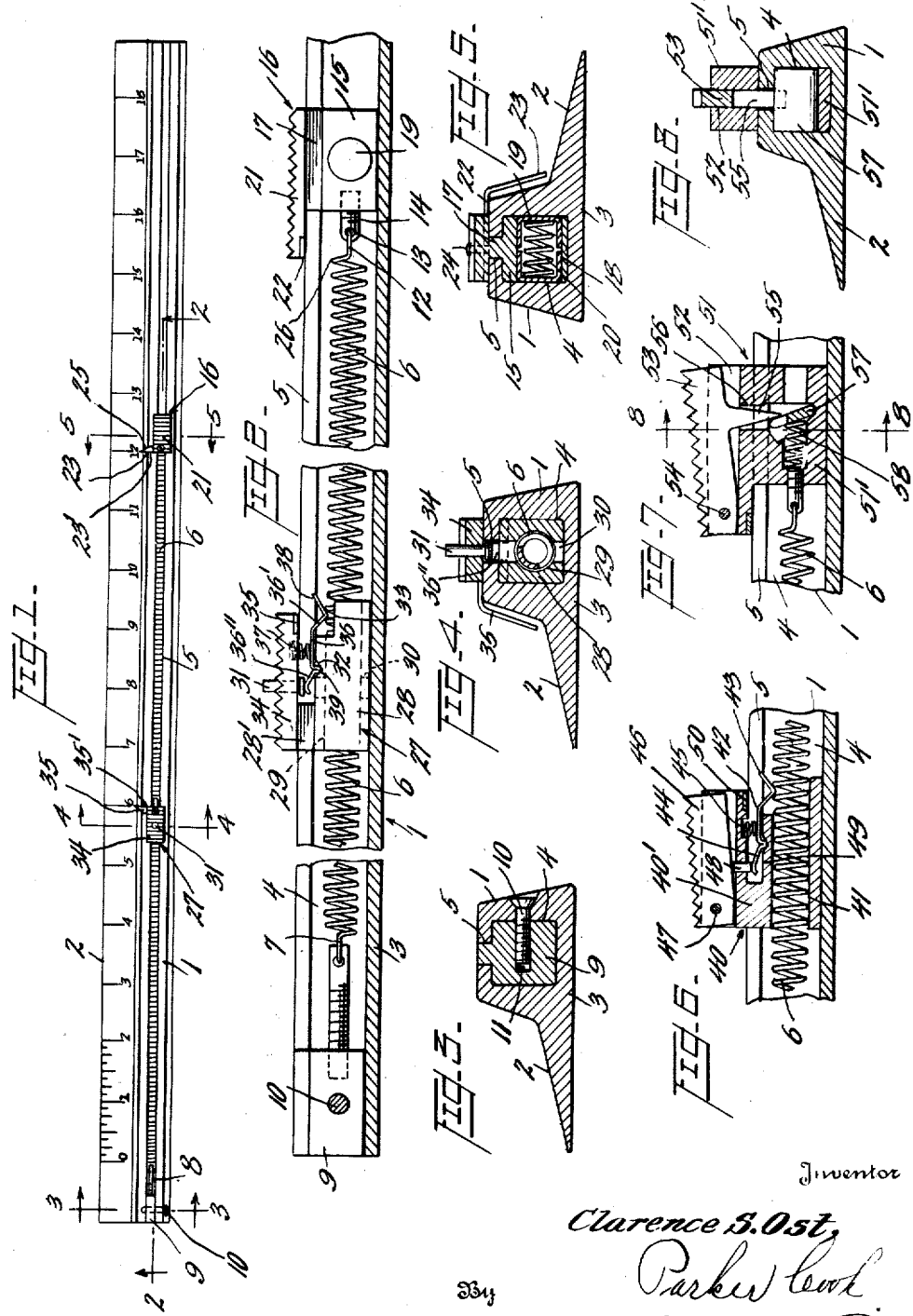
Inventor
Clarence S. Ost,
By Parker Cook
Attorney June 24, 1947.  C. S. OST  2,422,745
PROPORTIONAL RULER
Filed Feb. 14, 1945  2 Sheets-Sheet 2
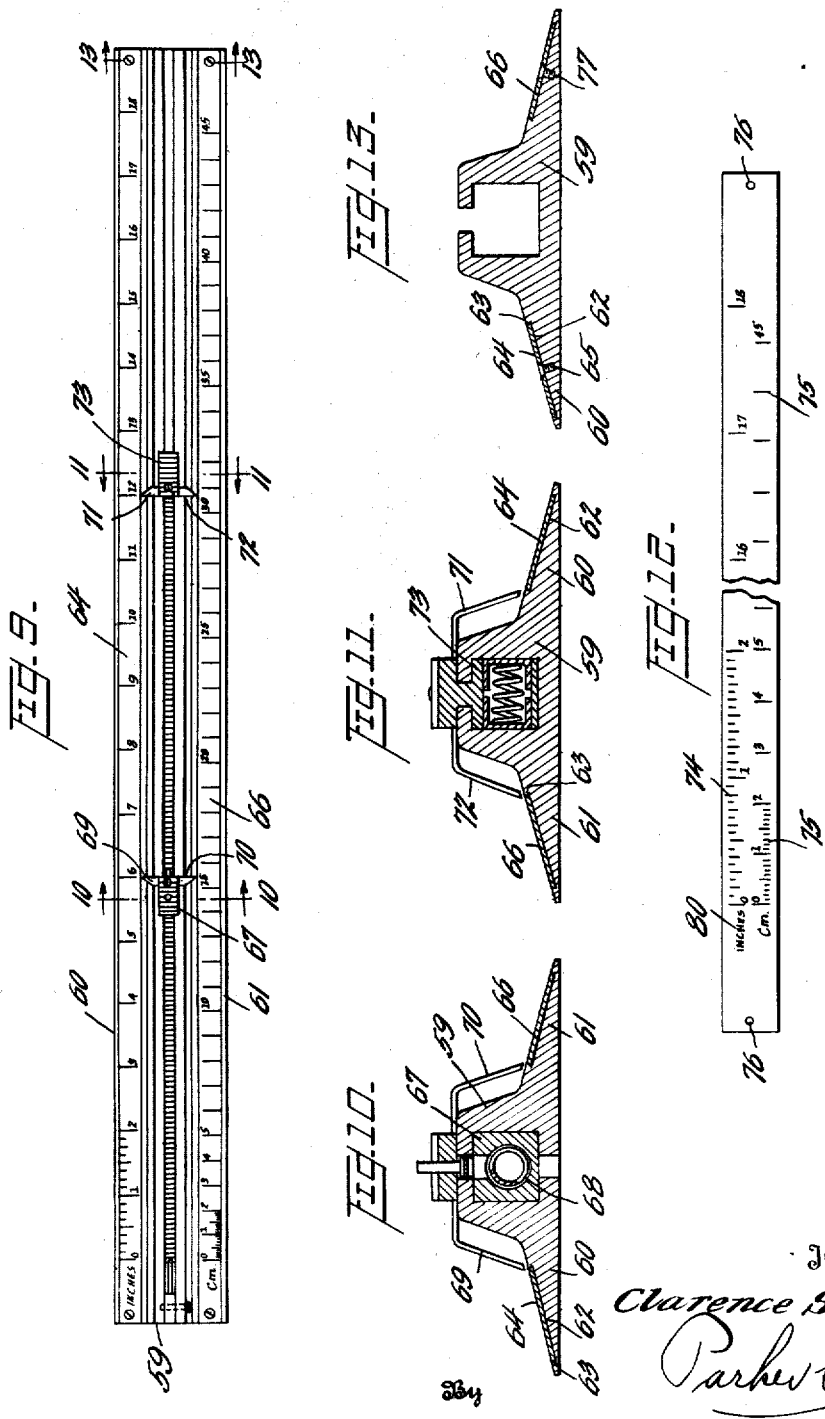

Patented June 24, 1947

2,422,745

UNITED STATES PATENT OFFICE 2,422,745

PROPORTIONAL RULER

Clarence S. Ost, Atlantic City, N. J.

Application February 14, 1945, Serial No. 577,796

6 Claims. (Cl. 33—107)

My invention relates to new and useful improvements in a proportional ruler and has for an object to provide a ruler that may be quickly and readily operated to visibly give the answer and thus save time in mathematically figuring the problems.

As is well known to those skilled in the art, photographers, photo-engravers, lithographers, typographers, artists, printers, etc., are often required to make reductions or enlargements from photographs, art work and other similar material usually designated as "copy."

In some instances, the desired long dimension for the copy will be given and it will be desirable to know the proportional short dimension. On the other hand, the shorter dimension may be given and it will be necessary to determine the longer proportional dimension.

Ordinarily this entails mathematical calculations and where there are fractions involved it takes some little time to make the calculations and computations.

One of the objects of the present invention, therefore, is to provide a ruler with the graduations or indicia on the ruler and so arrange the movable parts that after the given proportions are established, it is only necessary to move the primary indicator to the one desired given dimension and a secondary indicator will be actuated, keeping its set proportions to immediately establish the other desired dimension.

Still another object of the invention is to provide a proportional ruler that may be used for quickly establishing any desired given proportion and although the ruler is especially adapted for figuring desired proportions for photographs, copy, prints, art work, etc., any desired indicia or scale may be printed on the ruler so that its adaptability is not limited to the examples mentioned above.

Still another object of the invention is to provide a proportional ruler in which there is preferably a coiled spring element that will stretch evenly throughout its length, and to so arrange the indicator for the lesser dimension that it may be readily locked or unlocked from its relationship and proportion with respect to the primary indicator.

Still another object of the invention is to so construct this secondary indicator, that is, the indicator that shows the lesser dimension that even though it should be moved without first being unlocked from its coiled spring, the latch will automatically be forced from its position between two of the coils or turns of the spring and thus slide harmlessly over the spring rather than stretch any of the coils beyond their elastic limit, which would damage and destroy the ruler until such time as a new spring could be inserted.

Still another object of the invention is to provide a proportional ruler preferably made of wood or plastic having a longitudinal chamber or bore extending throughout its length to thus house the coiled spring and the primary and secondary indicators.

Still another object of the invention is to provide a modified form of proportional ruler having two extensions at the base, that is, one on each side of the base and in which extensions will be carried the desired scales or graduations, one of the scales being graduated for instance in inches and the other scale being graduated in picas or centimeters; and to further provide the primary and secondary indicators with pointers on their opposite sides so that a reading may be taken on either or both of the scales at the same operation.

Still another object of the invention is to provide a proportional ruler where the extension or extensions at the base are formed to quickly removably receive the graduated scales so that different scales may be substituted whenever desired.

Still another object of the invention is to provide a proportional ruler wherein the ruler per se or frame may be made of wood or plastic so that the same will be relatively light in weight.

Also, the assembling of the parts may be quickly carried out to thus reduce the cost of manufacture.

Still another object of the invention is to provide a proportional ruler that besides being relatively light in weight is easy to operate and relatively inexpensive to manufacture.

With these and other objects in view, the invention consists in certain new arrangements and combination of parts as will be hereinafter more fully described and pointed out in the claims.

Referring now to the drawings showing a preferred embodiment and three slight modifications:

Fig. 1 is a top plan view of the ruler, the secondary indicator being shown set in the proportion of two to one;

Fig. 2 is a longitudinal sectional view taken on line 2—2 of Fig. 1 looking in the direction of the arrows;

Fig. 3 is a sectional view taken on lines 3—3 of Fig. 1 looking in the direction of the arrows;

Fig. 4 is a sectional view taken through the ruler and the secondary indicator on lines 4—4 of Fig. 1 looking in the direction of the arrows;

Fig. 5 is a sectional view taken through the ruler and the primary indicator on lines 5—5 of Fig. 1 looking in the direction of the arrows;

Fig. 6 is a sectional view of the slight modification of the secondary indicator;

Fig. 7 is a sectional view of a still further slight modification of the primary indicator;

Fig. 8 is a sectional view taken on lines 8—8 of Fig. 7 looking in the direction of the arrows;

Fig. 9 is a view similar to Fig. 1 showing a modified form of ruler wherein the ruler is provided with extensions on its opposite sides each carrying a card or plate with the desired graduations thereon;

Fig. 10 is a sectional view taken on line 10—10 of Fig. 9 through the secondary indicator showing oppositely positioned pointers one for each of the scales;

Fig. 11 is a similar view taken on line 11—11 of Fig. 9 through the primary indicator and showing the oppositely positioned pointers;

Fig. 12 is a still further modified form of scale plate or card; and

Fig. 13 is a section taken on line 13—13 of Fig. 9 showing a set screw for holding the scale in place.

Referring now more particularly to the several views and to the preferred form and to Figs. 1 and 3 for the moment, there will be seen the body or frame 1 of the ruler which may be made of any metal or alloy, or it may be made of wood or plastic.

There will also be seen the extension or foot 2 that extends throughout the length of the ruler body thus providing a relatively wide base 3 that is of sufficient width to conveniently carry the graduations or other desired indicia, and so that when the ruler is placed on a copy or other flat surface, the ruler will not tip or turn in the hands of the operator.

Also, formed longitudinally throughout the length of the ruler body is the central chamber 4, while the top wall of the ruler is cut out longitudinally to form the groove or track 5 for the primary and secondary indicators about to be explained which slide along in this groove and chamber and have parts that cooperate with an inner coiled spring as will be shortly mentioned.

It will be understood if the body of the ruler so far described is made of plastic, the chamber and upper grooves will be molded or formed during the molding of the ruler, whereas if it is made out of wood, these chambers and grooves may be machined or otherwise formed.

Carried within the chamber 5 is preferably a coiled spring 6 of uniform tension throughout, while one end of the spring 7 is hooked to the threaded bolt or pin 8 which is threaded centrally in the block 9 that fits within the chamber 4 and the groove 5. This block 9 is fixedly and permanently held in place by the screw 10 that is passed through the aperture 11 in the one side of the ruler body 1.

Thus, one end of the spring 6 is always held in fixed relationship with its frame. Likewise, the opposite end 12 of the spring has its end passed through an eyelet 13 in the threaded pin 14 which pin in turn fits within the end of the block 15, which block forms the body of the primary indicator 16.

It will be noticed that this block 15 has an upper web 17 that slides in the aforementioned groove 5 while the body of the block 15 is slidable within the chamber 4.

To frictionally hold the indicator 16 in a desired set position there is the transverse aperture 18 within the block 15 in which is fitted the small divided container 19 in which is fitted the small coil spring 20.

The spring 20 being under compression will force the halves of the cup or container 19 outwardly and frictionally engage the inner walls of the chamber 4 so that when this primary indicator 16 is moved along the ruler, it will remain in the position in which it is set until again moved by the hands of the operator.

For conveniently moving the primary indicator there is the top portion or head 21 extending well across the groove 5 and the operator may rest his finger on the serrated head, and quickly and conveniently slide the primary indicator to the point desired.

As also may be seen from Fig. 5 there is the pointer or finger 22 which is bent downwardly as at 23, and this pointer is held in place by the small tack 24 or may be inserted in the block 15 and held in place by any other desired means.

As may be seen in Fig. 1, the outer end 23 of the pointer 22 is straight along one side 23' and lies flush with the forward end of the primary indicator 16. The other side of the finger may be tapered as at 25 to provide a sharper point to come opposite the graduations.

It will also be noticed that the point of the finger should be right opposite the last coil 26 of the spring element 6 where the coiled spring 6 is secured to its primary indicator 16.

It might be mentioned here that the pointer on the secondary indicator later to be mentioned, is formed in the same manner but oppositely positioned so that the two indicators may be placed right against each other and the flat side of the fingers lie adjacent to each other, thus making it possible to take a small or minute proportional measurement.

*Secondary indicator*

Referring now to what I term the secondary indicator 27, and referring for the moment to Figs. 2 and 4, it will be seen that the indicator consists of a substantially rectangular block 28 having a central bore 29 that is slightly greater in diameter than the outside diameter of the coiled spring 6. On the top of the body of the block 28 there is a small upstanding web 28' that is designed to slide in the groove 5 formed in the ruler 1, while the block 28 is designed to sliding fit within the chamber 5 of the ruler.

The block 28 is preferably formed of fibre, "Bakelite" or other plastic so that it can be machined or molded accurately and will withstand the uses to which it will be put during the life of the ruler.

There is a vertical aperture 30 extending through the block so that before the block is placed within the chamber 5, a small push pin 31 may be passed through the block 28 and this pin 31 will be held in place by the upper end of the latch which will be shortly explained. It will be noticed that this vertical aperture 30 is just behind the rear end of the aforementioned web 28'. Also, the block 28 is nicked or provided with a V or U shaped transverse groove 32 for the reception of the fulcrum of the latch about to be mentioned while the forward end of the block 28 (Fig. 2) is cut out as at 33 as may be seen in Fig. 2.

On the top of the web 28" is the top or thumb piece or head 34 which overlies the groove 5 and through this thumb piece also extends the aforementioned pin 31. Also, carried by the head 34 is the pointer finger 35 similar to the pointer 22 but with its straight side 35' facing the straight side 23 of the primary indicator.

Now, resting on the top of the body of the block under the head and near the forward end is what I term the latch 36 and to hold this latch in its lowered or normal position is a small coiled spring 37 that rests on the top of the latch and is inserted in the undersurface of the head 34.

It will be understood that this top 34 is an integral part of the block 28 but it might be an additional piece and secured in place.

Referring again to the latch 36 formed of metal, it will be seen that it extends downwardly as at 36ᵃ and then upwardly and outwardly as at 38 forming a V shaped bend which extends down between two of the turns or coils of the spring 6 when the latch 36 is in its lowered or normal position. The latch 36 is also bent back on itself as at 39 near its opposite end to fit in the aforementioned transverse groove 32 after which the latch extends upwardly as at 36ᵇ to have its end directly under the aforementioned push pin 31.

Thus, when the push pin 31 is depressed, it will depress the end 36ᵇ of the latch 36, it pivoting on the return bend 39 and this will elevate the forward end 38 so that the V bend will be raised from between the two coils of the spring 6.

It will be seen as far as the specification has proceeded that when the secondary indicator 27 is set at any desired position, the V shaped bend of the latch will extend between two turns of the spring 6 to hold the indicator in a set position but that on a pushing of the push pin 31, the forward end of the latch 36 will be elevated so that the latch will no longer contact with the spring and the indicator is free to slide.

On the other hand, it will be seen that should the operator for any reason move this secondary indicator 27 without depressing the little push pin 31, nevertheless the coil spring 6 will not be damaged because the upwardly and outwardly extending end 38 of the latch will ride upwardly so that the V of the latch will slide over the adjacent coils, the latch compressing the relatively small spring 37.

Thus, it will be seen that even though the secondary indicator 27 may be quickly and readily set by pressing the small push pin 31, still if it is overlooked, the coils of the spring 6 adjacent to the latch 36 will not be damaged or stretched beyond their elastic limit which would, of course, completely destroy the efficiency of the proportional ruler.

It will be seen that this secondary indicator 27 after once molded and/or cut to shape will have the push pin 31, the spring 37, and the latch 36 assembled in their correct position after which the indicator 27 will be placed within its chamber 5 from one end or the other of the ruler so that the spring 6 may be passed therethrough and the said spring secured in place as has been formerly mentioned.

*Modified secondary indicator*

Referring now to a slight modification of a secondary indicator 40 Fig. 6, it will be seen that it is substantially the same. However, in this instance there is a similar block 40' having the longitudinal bore 41 through which the spring 6 will extend and there is likewise a metal latch 42 with its V shaped forward portion 43, its rear arm 44 and the small spring 45 to hold the latch 42 in place, but in this instance, instead of having a push pin extend up through the head, there is a metal thumb piece 46 pivoted at 47 that extends normally at a slight angle and is held in its elevated position by a pin 48 which in turn bears on the elevated rear end 44 of the latch 42. The block 40', of course is cut out as at 49 to receive the aforementioned latch and the small spring 45. The top of the block 40' also carries a pointer 50 similar to the preferred form.

With this form of secondary indicator 40, it will be seen that as soon as the thumb piece 46 of the indicator is depressed, the pin 48 is in turn moved to depress and to unlock the latch, or in other words, raise the latch from between two adjacent coils of the spring 6.

In both instances, the secondary indicators may be moved without damaging the spring 6 even though the latch is not released. However, to preserve the life of the indicator, it is more desirable at all times to release the latch.

*Modified primary indicator*

Referring now to the slight modification of a primary indicator 51, reference is made to Figs. 7 and 8. Here again there is a small block 51' provided with a longitudinal slot 52 in its upper surface in which there is a pivotal thumb piece 53 which is pivoted as at 54 and there is a pointed projection or spear point 55 on its undersurface which passes through an aperture 56 in the block 51' and will extend down through the longitudinal groove 5 of the ruler. One side of the spear point will bear against the small transverse angular positioned choke plate 57, the top surface of which will frictionally bear against the upper walls of the chamber 4.

Now, when the plate 57 is in the angular position as shown in Fig. 7, its upper surface will choke against the upper walls of the chamber 4. There is also a small spring 58 inserted in the block to keep this plate 57 in its choked or locking position. However, it may be readily seen when the thumb piece 53 is depressed, the spear point 56 forcing the plate to a lower angle, will relieve the choking movement and permit the indicator 51 to freely slide until the pressure is taken off the thumb piece 53 when the plate 57 will again resume its locking position.

If the ruler 1 is made of wood, it might be desirable to have a plate with the desired markings or graduations thereon secured to the extension, whereas if the ruler is made of plastic, it may be desirable to print the graduations directly on the extension, although in both instances a removable graduated scale is probably more desirable.

*Modified body construction*

Referring now to a slightly modified form of body construction and for the moment to Figs. 9, 10, and 11, it will be seen that the ruler is substantially the same, one of the main differences being that there is an extension on each side of the body for carrying the desired scales; and likewise both the primary and secondary indicators carry pointers on their opposite sides so that the reading can be taken from either or both sides of the scale.

In Fig. 9 there will be seen the body 59 of the ruler with the extension 60 extending along its one side and the like extension 61 running along its opposite side. The upper surface of the extension 60 may be cut or depressed as at 62 leaving the under-cut walls 63 so that a card or strip 64 with the desired graduations may be slipped beneath the under-cut walls and held in place by a small set screw 65 as shown in Fig. 13.

In the same way, a similar card 66 may be secured in the extension 61 so that this form of ruler has a graduated scale on each of its sides, also one scale may be in inches and the other in centimeters.

As may be seen in Fig. 10, there will be a secondary indicator 67 through which passes the coiled spring 68 while the remainder of the indicator is exactly the same as shown in the preferred form with the one exception, and that is there are two oppositely positioned pointers, the one 69 and the other 70, the one for taking the readings from the one scale and the other for taking the readings from the opposite scale.

In a like manner as shown in Fig. 11, there are two oppositely positioned pointers, the one 71 and the other 72 carried by the primary indicator 73 which in all other instances is the same as that shown in the preferred form of primary indicators.

Thus, if the user has an occasion to take readings of copy in centimeters, he can read from one scale or if he is to work with inches, he can take the readings from the opposite scale.

Finally, as it may be seen from Fig. 12, it might be desirable to have two graduated scales on the one card and this is illustrated by the card 73 with the indicia 74 in inches and the indicia 75 in centimeters on the other longitudinal half of the card.

The card may have the holes 76 in its opposite ends so that set screws 65 may be passed therethrough to fit in receptive holes 77 formed near the ends of the ruler.

Referring again to the preferred form, it will be seen that I have devised a proportional ruler wherein after two dimensions are known and the same proportion is to be retained and then the third dimension given, it is only necessary to first set the secondary indicator 27 in the proportion desired to the primary indicator 16 and then move the primary indicator to the desired third given dimension and the secondary indicator 27 will move with the first indicator 16 and give the desired fourth proportional dimension.

Likewise, of course, if a certain proportion was to be retained and the desired new shorter dimension given and it is desired to establish the longer dimension, the secondary indicator 27 should be set in its desired proportion to the primary indicator 16, and then the primary indicator 16 would be moved along the ruler until the finger 35 of the secondary indicator 27 registered with the given new short dimension and the other desired dimension (longer dimension) would be read opposite the finger 23 of the primary indicator 16.

As an example—if a copy for instance is 10" long and 5" wide and it is desired to make reproductions 7" wide and still retain the proportion, then the primary indicator is set with its finger 23 at 10" and the secondary indicator 16 is set with the finger 35 at 5, then the primary indicator would be moved to the right (Fig. 1) until the finger 35 of the secondary indicator was opposite the desired dimension, to wit, 7" and the finger of the primary indictator would, of course, have moved out to be opposite the numeral 14 on the scale.

Here again, the simplest form of example is set out merely for the purpose of clarity. The ruler may be made in any length and I have found one of 18" to be a desirable size, but of course, it could be made much longer or even shorter where a certain class of work is necessary.

It will also be seen that I have provided a primary indicator that may be retained in place by a friction exerted on the side walls of the chamber or on the other hand, by a slight modification of the primary indicator the same may be held in place by friction or a choking action exerted on the inner top walls of the chamber.

Likewise, I have provided a secondary indicator that may be quickly and conveniently moved along the coiled spring by exerting a slight pressure on a push pin or on a thumb piece and I have provided a latch mechanism that will lock to prevent the secondary indicator from slipping or sliding during its movement, while at the same time, it is fool-proof in that even though this downward pressure is not exerted on the latch, the coiled spring cannot be damaged by a movement of the indicator even without first exerting a slight pressure at the top.

Also, it will be seen that I have also devised a proportional ruler wherein the indicators may carry two pointers and the base will have two extensions so that with the one operation of the indicator, the readings may be taken in inches or centimeters or in any other graduations that appear on the scale.

Finally, it will be seen that it is a very simple matter to substitute one scale for the other depending on the class of work for which the scale is to be used.

I claim:

1. In a proportional ruler for linear measurements a body having an open top chamber extending throughout its length, a coiled spring fitted within the body and having its one end fixedly secured near one end of the body of the ruler, graduations extending along the body of the ruler, a primary indicator slideably mounted within said chamber and attached to the other end of said spring, frictional means carried within the primary indicator for engaging the walls of the chamber to hold the primary indicator in a set position; a secondary indicator slidably mounted within said chamber and having a bore through which said coiled spring passes, a pivotal latch carried by said secondary indicator, a spring for normally holding the latch between two of the coils of the spring and means for raising the latch from out of engagement with the two said coils to thus permit the secondary indicator to be freely moved to a predetermined position.

2. In a proportional ruler, a body having an open top chamber extending throughout its length, a coiled spring fitted within the body and having its one end fixedly secured near one end of the body of the ruler, graduations extending along the body of the ruler, a primary indicator slideably mounted within said chamber and attached to the other end of said spring, frictional means carried within the primary indicator for engaging the walls of the chamber to hold the primary indicator in a set position; a secondary indicator slidably mounted within said chamber and having a bore through which said coiled spring passes, a pivotal latch carried by said secondary indicator, said pivotal latch having a V shaped bend at its outer end, a relatively light spring for normally holding the V bend of the latch between two of the adjacent coils of the coiled spring, means for raising the latch from out of engagement with the two said coils of the coiled spring to thus permit the secondary indicator to be freely moved to a predetermined position and the V bend of the latch also raising out of engagement between the two adjacent coils of the spring even though said latch raising mechanism be not released to thus prevent accidental damage to the said coiled spring.

3. In a proportional ruler, a body having a central bore extending throughout its length, the upper portion of the body being cut out also throughout its length and the cut-out portion registering with said bore, an extension at the base of the body extending along the side of the body and adapted to carry graduations thereon, an elastic element mounted within said bore and having one end fixedly secured with relation to the body, a primary indicator secured to the opposite end of said elastic element and travelling within said bore; a secondary indicator also mounted within the bore and provided with a pointer adapted to lie opposite the said graduations and a latch having a substantially V shaped bend near its forward portion and means for locking and unlocking the said latch to the said elastic element.

4. In a proportional ruler, a body, a coiled spring secured in the body, a secondary indicator comprising a block having a central bore through which passes said spring, a latch carried by said indicator having a substantially V shaped bend near its outer end, means for forcing the V shaped portion of the latch between two adjacent coils of the said spring for locking the indicator to said coiled spring, and means for lifting the latch from between the adjacent coils of the spring whereby said indicator is free to slide with respect to said coiled spring.

5. In a proportional ruler, a body, a coiled spring, one end fixedly secured within the body, a primary indicator connected to the opposite end of the spring and means for frictionally locking the indicator in the desired position along the ruler, a secondary indicator comprising a block having a central bore through which passes said spring, a latch carried by the indicator having a substantially V shaped bend at its outer end, spring means for forcing the V shaped portion of the latch between two adjacent coils of said spring for locking the indicator to said coiled spring, means for lifting the latch from between the adjacent coils of the spring whereby said indicator is free to move in respect to said coiled spring, and the V shaped latch automatically raising from between the two adjacent coils of said spring on a movement of said secondary indicator even though the latch is not first positively raised.

6. In a proportional ruler, a body, a main coiled spring secured at its one end within the body, a primary indicator connected to the opposite end of the spring, means for locking said indicator in a desired position along the ruler, a secondary indicator including a block having a central bore through which passes said spring, a latch carried by the said indicator and having a toothed shape portion at its outer end, a relatively light spring also carried by the block for normally holding the toothed shape portion of the latch between two of the adjacent coils of the main spring, means carried by the secondary indicator for normally releasing said latch, and the small spring compressing on a movement of said indicator allowing said latch to raise even though said latch is not manually released to thus allow the tooth of the latch to ride harmlessly over the respective coils of the first mentioned spring.

CLARENCE S. OST.

REFERENCES CITED

The following references are of record in the file of this patent:

UNITED STATES PATENTS

| Number | Name | Date |
|---|---|---|
| 776,897 | Ferris | Dec. 6, 1904 |
| 1,422,925 | Carter | July 18, 1922 |
| 2,331,298 | Bennett | Oct. 12, 1943 |
| 931,164 | Vining | Aug. 17, 1909 |
| 253,526 | Geiger | Feb. 14, 1882 |

FOREIGN PATENTS

| Number | Country | Date |
|---|---|---|
| 395,014 | France | Dec. 16, 1908 |